United States Patent
McCormack et al.

(10) Patent No.: US 9,479,399 B2
(45) Date of Patent: Oct. 25, 2016

(54) COMMISSIONING A NETWORK SYSTEM

(71) Applicant: Koninklijke Philips N.V., Eindhoven (NL)

(72) Inventors: James Joseph Anthony McCormack, Eindhoven (NL); Hendrik Jan Jozef Hubertus Schepers, Veldhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 201 days.

(21) Appl. No.: 14/282,263

(22) Filed: May 20, 2014

(65) Prior Publication Data

US 2015/0341222 A1 Nov. 26, 2015

Related U.S. Application Data

(63) Continuation of application No. 13/059,690, filed as application No. PCT/IB2009/053724 on Aug. 25, 2009, now Pat. No. 8,811,225.

(30) Foreign Application Priority Data

Aug. 27, 2008 (EP) .................................... 08163035
Jun. 10, 2009 (EP) .................................... 09162445

(51) Int. Cl.
*H04W 8/00* (2009.01)
*H04L 12/24* (2006.01)
(Continued)

(52) U.S. Cl.
CPC ............... *H04L 41/12* (2013.01); *H04L 12/24* (2013.01); *H04L 61/2038* (2013.01); *H04L 61/6081* (2013.01); *H04W 8/005* (2013.01);
(Continued)

(58) Field of Classification Search
CPC ..... H04W 48/12; H04W 8/005; H04W 8/02; H04W 8/26
See application file for complete search history.

(56) References Cited

U.S. PATENT DOCUMENTS

| | | | |
|---|---|---|---|
| 8,665,762 B2* | 3/2014 | Knibbe | H04L 12/2803 370/255 |
| 2005/0176408 A1* | 8/2005 | Stein | H04W 12/08 455/411 |
| 2006/0077917 A1* | 4/2006 | Brahmajosyula | H04L 12/66 370/310 |
| 2006/0244624 A1 | 11/2006 | Wang et al. | |
| 2008/0032736 A1 | 2/2008 | Bari et al. | |

(Continued)

FOREIGN PATENT DOCUMENTS

| | | |
|---|---|---|
| WO | 2005091572 A1 | 9/2005 |
| WO | 2007040398 A1 | 4/2007 |
| WO | 2008084356 A1 | 7/2008 |

*Primary Examiner* — Raj Jain
(74) *Attorney, Agent, or Firm* — Meenakshy Chakravorty

(57) ABSTRACT

A wireless network system (30, 60) and a method for commissioning a wireless network system (30, 60) is described. The network system (30, 60) comprises at least a network device (1, 1', 1") and a joining device (21, 81, 91, 101, 111). In a commissioning mode, the network device (1, 1', 1") broadcasts network identification information. The joining device (21, 81, 91, 101, 111) sends, upon reception of the network identification information, a request to said network device (1, 1', 1") to join the network, comprising a predefined address of said joining device (21, 81, 91, 101, 111). The network device (1, 1', 1") assigns said joining device (21, 81, 91, 101, 111) a network address and stores corresponding data. The network device (1, 1', 1") sends joining information comprising at least said network address to said joining device (21, 81, 91, 101, 111) using said predefined address and said joining device (21, 81, 91, 101, 111) receives the network address, so that the joining device (21, 81, 91, 101, 111) is addressable in the network system (30, 60) using said network address.

7 Claims, 7 Drawing Sheets

(51) Int. Cl.
   *H04L 29/12*   (2006.01)
   *H04W 48/12*   (2009.01)
   *H04W 8/02*    (2009.01)
   *H04W 8/26*    (2009.01)
(52) U.S. Cl.
   CPC .............. *H04W 48/12* (2013.01); *H04W 8/02* (2013.01); *H04W 8/26* (2013.01)

(56) References Cited

U.S. PATENT DOCUMENTS

| | | | |
|---|---|---|---|
| 2008/0130673 A1 | 6/2008 | Cregg et al. | |
| 2008/0274766 A1* | 11/2008 | Pratt .................. | G01D 21/00 455/552.1 |
| 2009/0066473 A1* | 3/2009 | Simons ................ | G01S 5/0027 340/3.1 |

* cited by examiner

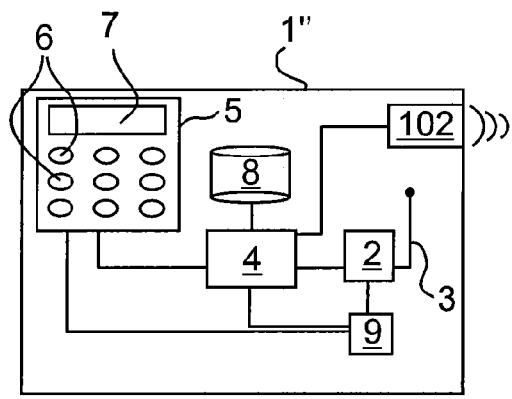
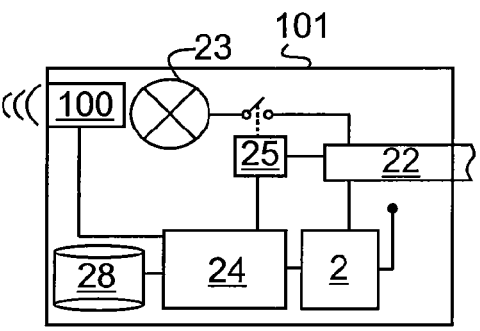
FIG. 10a  FIG. 10b
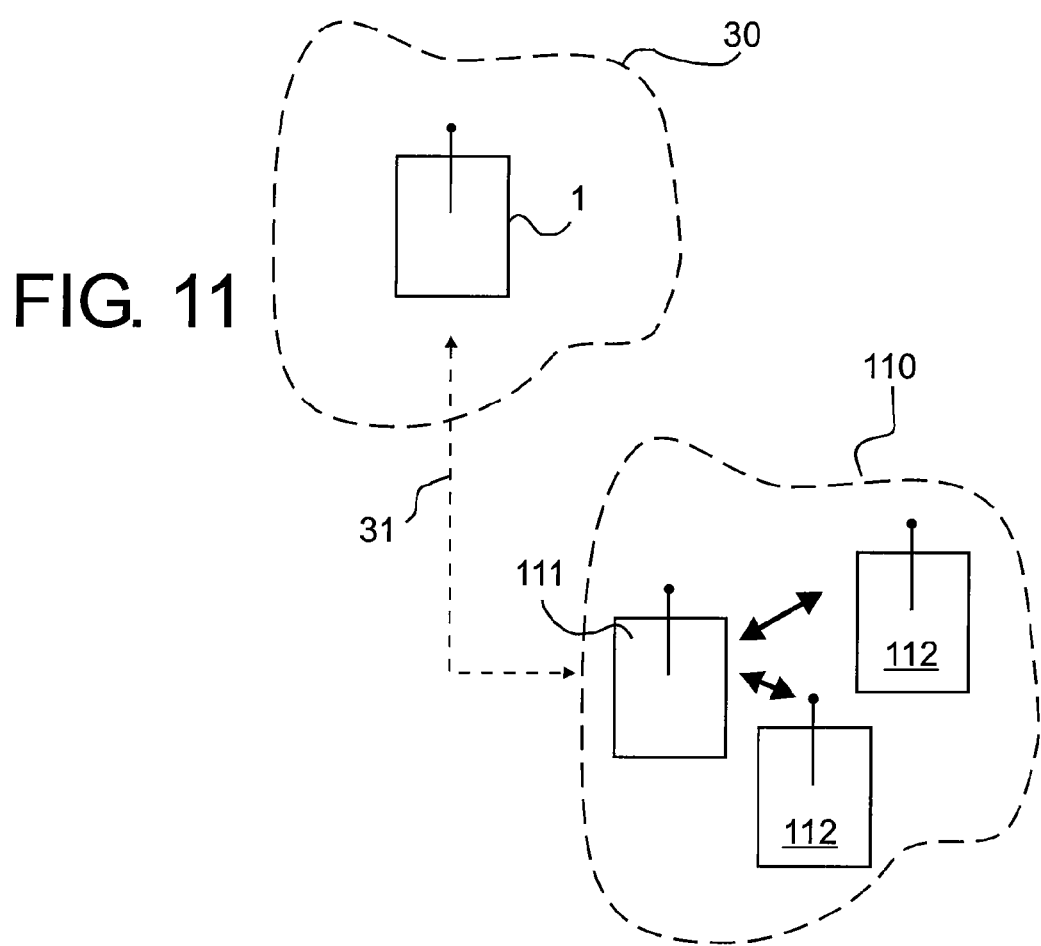
FIG. 11

COMMISSIONING A NETWORK SYSTEM

FIELD OF THE INVENTION

The invention relates to a wireless network system and a method of commissioning a wireless network system.

BACKGROUND OF THE INVENTION

Wireless network systems with devices communicating over a wireless medium are today common for a variety of applications. Usually in such network systems, each device being part of the network has a distinguishable address, so that it is possible to direct messages to a specific device using this address. Each communication thus comprises in addition to the message at least an address, so that the message reaches its desired recipient. For example, in a network having remote control units and multiple controllable appliances, e.g. lighting devices, temperature sensors or heating devices, each of the remote control units needs information on how to address each single appliance to be able to control the appliances individually and in user-defined groups or to process received sensor values appropriately.

To operate a network system, it is thus necessary for each of the network devices to be addressable in the network. When a new network is formed or the configuration of a network is changed, i.e. a device joins or leaves the network; a configuration or commissioning of the network is needed.

Commissioning a network system is a tedious task for the user, especially for consumers, which are interested in a comfortable installation and "plug-and-play" behavior of the network components. Usually, it is necessary to assign a network address to each device in the network, which address then has to be distributed to the other devices in the network to enable network operation.

It is therefore an object of the present invention to provide a wireless network system, which allows an easy, convenient and reliable commissioning of a wireless network system.

SUMMARY OF THE INVENTION

The basic idea of the invention is to provide a wireless network system in which a network device being part of the network may communicate with a joining device, i.e. a device not jet being part of the network, in a commissioning mode. In the commissioning mode, the network device provides joining information to said joining device, needed for network communication, so that the joining device is added to the network, also referred to as "joining" the network or "association" of the joining device with the network.

The wireless network system according to the invention comprises at least a network device and a joining device, each having a communication interface for transmitting and receiving data over a wireless medium, which is preferably a shared medium. The communication interface may be of any suitable type, for example an optical communication interface, although preferably, the communication interface is a radio frequency (RF) communication interface, most preferred configured for communication with a standard communication protocol, such as IEEE 802.11 or IEEE 802.15.4.

The network device further comprises at least a network configuration memory and network identification information. The network identification information allows to reliably and uniquely identify said network system at least in its physical vicinity, thus the network identification information is at least "virtually unique", e.g. a personal area network-ID, also known as PAN-ID. Preferably, the network identification information is a unique identifier of the network, most preferably a factory-set unique identifier. For example, the network identification information may be a universally unique identifier (UUID) of the network device itself, usually based on the IEEE MAC-address, e.g. a 6-Byte device identifier.

The network identification information may be hard-coded in the network device or may be comprised in a variable memory. Preferably, the network identification information is stored in the network configuration memory.

The joining device comprises a predefined address, which may be any kind of information, allowing individualizing said joining device. For example, the predefined address may be a factory-set address. Preferably, the predefined address is a MAC-address. The predefined address may be hard-coded, e.g. in the communication interface or comprised in a suitable memory. The joining device further comprises a device configuration memory, in which at least a network address can be stored. Although it is sufficient, that the device configuration memory is only once writable during commissioning, it is preferred that the device configuration memory is a variable memory, for example in case the device is to be removed from the current network system and added to a further network system. Certainly, the network device and the joining device may comprise further components, such as for example a power supply, e.g. a battery or a mains-connected power supply unit, a processing unit, a user interface or further memory.

The network device and the joining device are configured to operate at least in a commissioning mode, in which the network device broadcasts the network identification information in the wireless medium. The joining device, which receives said broadcast, returns a request to join the network, comprising at least its predefined address to the network device. Upon reception of said request to join the network, the network device assigns said joining device a network address and sends joining information comprising at least said network address to the joining device. Since the joining device is not yet addressable in the network system, the message is sent to the joining device using its predefined address, transmitted to the network device in the request to join the network.

The network device stores at least data corresponding to said network address in its network configuration memory so that the network address is assigned to only one device in the network and is not assigned twice. The data therefore may be in the format of a simple counter, but preferably comprises the assigned network address, so that the network device "knows" the joined device for future communication in the network using the assigned network address.

According to a development of the invention, the network configuration memory comprises the network address of the joined device together with its predefined address, to avoid that a device is added twice to the network.

According to the invention, the joining device stores said joining information upon reception in its device configuration memory and is now addressable in the network system using the network address for future communications. Subsequent to the above communication, the joining device is considered a member of the network system and the commissioning ends. Both devices then are able to operate in the network, e.g. in a network communication mode for communication with each other or other devices in the network. It should be noted, that in a broad sense, before any commissioning, the network is only formed by the network device, since no other device is addressable in the network system. The above described commissioning is repeated, when a further joining device is to be added to the network.

The inventive wireless network system thus allows an easy and reliable commissioning, in case the configuration of the network system needs to be changed. Although the invention has been explained with reference to a single network device and a joining device, the invention is not limited hereto and may comprise further devices, configured for network communication. Furthermore, it is possible that more than one of said network devices are present in the network, so that even in case one of said network devices is not functional, the network is advantageously reconfigurable, in contrast to a network system, having a single central coordinating device.

The network address may be of any suitable kind to enable that each device in the network system is individually addressable. The format and length of the network address may depend on the specific communications protocol used and, with regard to the length of the network address, i.e. the available address range, certainly on the number of devices in the network. Since it is only needed to address the devices, being part of the network individually, a "network-wide" unique address is preferred. Most preferred, the network address is a short address and the predefined address is a long address, i.e. the network address is shorter than the predefined address, which bears the advantage of a reduced network load of the addressing of a network communication. Especially in a case where the predefined address is a factory-set unique address, such as a MAC-address, the predefined address can be rather long, which would hinder an efficient network communication.

The network address is preferably assigned by the network device according to a defined address allocation scheme. Exemplary, the network addresses are assigned consecutive in the given address range, but may depend on the communications protocol used.

The joining information may preferably comprise further parameters, needed for the communication in the network. For example, such parameters may comprise information relating to network security, such as a security key for an encrypted communication, a channel number, e.g. MAC channel choices, arbitration information for dealing with network-ID collisions or a defined communications mode, depending on the communications protocol of the network system. The further parameters may be hard-coded, e.g. factory-set, or programmed in a suitable memory of the network device prior to the commissioning. Preferably, said parameters are stored in the network configuration memory. In case the network devices comprises and issues at least a security key, the network device may preferably correspond to a trust center.

The commissioning mode may be initiated by a user, for example by press of a corresponding "join mode" button on the network device and/or on the joining device. Preferably, the joining device is configured to determine, whether the device has already joined a network and only enters the commissioning mode, when the device is not part of a network; sometimes referred to a "virgin" device. For example, the joining device may query its device configuration memory and determine, whether the device configuration memory already comprises a network address. The commissioning mode is then only entered, in case said device configuration memory does not comprise a network address.

Alternatively or additionally the joining device may further preferred be configured to enter the commissioning mode in case the network device is within a given proximity to the joining device. Such a proximity measurement may e.g. be conducted by determining the received signal strength (RSSI) of a communication of the network device, such as said broadcast of the network identification information. In case the device configuration memory is not empty, i.e. the joining device has already been configured for use in a network system, a reset may preferably be conducted when the proximity is detected to remove the configuration parameters of the previous network system.

Preferably, the network device and/or the joining device each comprise a central processing unit, adapted at least to send/receive commands over the communication interface and implementing at least part of the behavior of each of the devices in the commissioning mode and/or the network communication mode. The behavior of the devices may at least partly be controlled by the central processing unit using a suitable programming, comprised in a memory.

As already previously described, the communication interfaces of the network device and the joining device may be configured for use in standard network systems. The communication in the commissioning mode may therefore correspond to any suitable communication protocol known today according to which a wireless communication may be established. A suitable group of preferred communication protocols for implementing the present invention are usually referred to as ad-hoc wireless network systems.

A particularly suitable and therefore preferred communication protocol for implementing the present invention is Zigbee. Although the invention is not limited thereto, it is explained in the following referring to Zigbee for illustration purposes.

Zigbee is an open standard and is based on the IEEE 802.15.4 communication protocol, which defines a physical link layer (PHY) and a media access control layer (MAC). Zigbee uses this protocol and defines a network layer (NWK) and an application layer (APL) on top of the MAC-layer, provided by IEEE 802.15.4. A description of Zigbee and the Zigbee protocol stack is disclosed in the Zigbee specification, e.g. in document 053474r17, describing "Zigbee 2007", dated Oct. 19, 2007, available from the Zigbee Alliance Inc.

Referring to Zigbee, the predefined address preferably corresponds to a MAC-address, sometimes also referred to as extended address, and said network address preferably corresponds to a Zigbee short network address.

According to a preferred embodiment of the invention, the network device is an end device. In the context of the present invention, the term "end device" is understood as a network device, which has no routing capabilities and which is not necessarily permanently active in the network system. The device may be in a "dormant" or sleep mode for long periods and only activate, when a transmission is required. Its overall power consumption is thus dramatically reduced. Preferably, the network device corresponds to a Zigbee end device and most preferably, the network device is a reduced function device (RFD), according to Zigbee.

According to a preferred embodiment of the invention, the network device is a mobile device, wherein the term "mobile" is understood to include devices, which are easily transportable by hand, i.e. having an adequate size and weight. Preferably said mobile device is not mains-connected, e.g. having a battery or other suitable power supply.

According to a development of the invention, the network device is a first control device further comprising a user control interface for sending an application control command to and/or receiving an application data value from a further device in the network. In the context of the present invention the term "user control interface" is understood to comprise any interface for user interaction, like an input interface for the initiation of an application control command to be sent or a display device for display of said application data value. For example, the user control interface may comprise several buttons and/or an LCD-display.

The application control command may be any kind of command for controlling an application device, for example for switching on and off a lighting unit, connected to a device in the network, and is in contrast to a network control command, intended for network configuration or network management purposes. The same applies to the application data value, which may exemplary comprise a sensor reading of a connected sensor.

With reference to wireless networks such as Zigbee, said application control command and application data value refers to a communication on the application layer and may correspond to an application object.

According to the set-up of the present embodiment, the first control device advantageously provides the above explained commissioning functionality in the commissioning mode and furthermore application functionality, i.e. sending application control commands or receiving application data values in the network communication mode. Thus, no further dedicated device is needed in the network system for commissioning, which advantageously reduces the complexity of the network and further enhances the operability for a user.

The first control device according to the present embodiment may be a computer or a simple wall switch, but preferably is a battery-operated remote control.

According to a development of the invention, the joining device is a function device comprising an application interface, configured to receive said application control command and/or to send said application data value. The application interface is connectable to an application device, e.g. for performing a controlling, switching or sensor function. The application device may be of any suitable kind, such as a lighting unit, a heating device or any type of electrically controllable device. For example in the case of a connected lighting unit, the application interface may be configured to switch the lighting unit on and off or to dim the lighting unit upon reception of the corresponding application control command Further, the application interface may alternatively or additionally be configured to send an application data value of a connected application device, for example a temperature reading of a temperature sensor, the reading of a water or electricity meter or an alert of a smoke or fire detector.

Preferably, said function device is integrated with the application device, e.g. with a lighting unit.

Especially in extensive wireless network systems having a large number of devices, it may be necessary to provide more than one control device, to enable a further enhanced operability. According to a preferred embodiment, the joining device is a second control device comprising a user control interface for sending an application control command to and/or receiving an application data value from further devices in the network.

In the present case, the second control device may preferably further comprise a network configuration memory, so that the second control device, once joined the network may itself initiate the commissioning mode, i.e. communicate with a further joining device and assign a network address.

The setup according to this preferred embodiment advantageously enhances the reliability of the network system, since even in case one of said control devices fails, a commissioning is possible and the network remains fully operational. Further, it is advantageously possible to commission the network with multiple control devices simultaneously.

To avoid that a single network address is assigned twice by a second control device joined to the network, a method for network address allocation is preferred. According to a development of the invention, the first control device is configured to additionally assign said second control device a defined address range, so that said joining information, transferred to the second control device in the commissioning mode, comprises address range information. The address range information is then used by the second control device, once joined the network, to assign a network address to a new joining device. The first control device marks the address range as occupied, so that no duplication of network addresses occurs, i.e. not network address is assigned twice by the first and the second control device.

Methods for an address range allocation are known in the art. For example, the first control device may assign the second control device a predefined number of addresses or it may divide its address range according to a given distribution scheme, depending on the protocol of the wireless network. For example in a Zigbee network, the short network address usually is of 16-Bit length, so a total number of 65.635 is assignable. The first control device may therefore assign the second control device an address range comprising the address numbers of 1-32.768, so that the address numbers 32.769-65.635 remain assignable for the first control device. Certainly, the second control device may commission a further control device and so on, so that a multitude of control devices may be present in the network.

Referring to the above explained address allocation and using the Zigbee protocol, preferably Zigbee Pro is used, which allows an advantageous "flat" network address assignment. An explanation of Zigbee Pro and a corresponding communications stack is disclosed in document 074855r05, dated January 2008, available from the Zigbee Alliance Inc.

Since during commissioning, i.e. in the commissioning mode, a communication in the network may not be possible, for example, in case the network communication is encrypted, it is preferred that in the commissioning mode, the communication interfaces of the network device and the joining device are configured for out-of-network communication. With reference to Zigbee, the communication in said commissioning mode may preferably correspond to Zigbee global PAN-ID transmissions, as described in document 053474r17, describing "Zigbee 2007" and dated Oct. 19, 2007, available from the Zigbee Alliance Inc.

Global PAN-ID transmission frames are addressed with a specific and reserved PAN number, e.g. DstPANID=0xFFFF, so that such transmission frames are routed to and may be received by every device in the transmission range. It is thus possible to communicate between devices which do not necessarily have to be in the same Zigbee network, i.e. providing out-of-network communication.

Alternatively or additionally and according to a development of the invention, the communication in said commissioning mode corresponds to Zigbee Inter-PAN transmissions. Zigbee Inter-PAN transmissions are defined in the Zigbee smart energy profile, as disclosed in document 075356r14, dated May 29, 2008, available from the Zigbee Alliance Inc.

Using Zigbee Inter-PAN transmissions it is possible for a network device to exchange information with a further device, which is not part of the Zigbee network, in a limited way.

The format of a Zigbee Inter-PAN transmission frame usually does not comprise a network address in the NWK layer, but is addressed with the MAC-address of the desired destination device. The use of Zigbee Inter-PAN transmissions is especially useful since it allows a reliable communication between a device of a Zigbee network and a joining device, not being part of the Zigbee network, without the need to "open" the Zigbee network, i.e. to temporarily disable the security measures to add the joining device.

According to a preferred embodiment of the invention, the network device comprises at least one predetermined proximity value and said joining device is configured to provide proximity information, relating to the distance between said joining device and said network device. The joining device sends said proximity information to said network device, which then determines whether said predetermined value corresponds to said proximity information, so that the joining information is only sent to the joining device in case the proximity information corresponds to said predetermined value. The present embodiment thus advantageously allows a more secure configuration of the wireless network system, since only devices, arranged in a defined distance to the network device, which are considered as being trustworthy, are allowed to join the network. For example, in a household environment, it may be desirable that a new and un-configured device of a neighbor is not accidentally added to the network.

The proximity information may include any information, allowing determining the physical distance between the joining device and the network device. The proximity information may preferably correspond to the signal strength of a communication of the joining device sent to the network device, e.g. the signal strength of the request to join the network, thus being inherently comprised in the message of the joining device. Alternatively or additionally, the joining device may be configured to determine the signal strength of a communication of the network device, e.g. the received broadcast, so that the proximity information corresponds to the signal strength of the received communication of the network device.

Most preferably, the proximity information is comprised in the request to join the network, sent to the network device.

The predetermined proximity value may be of any suitable kind, allowing comparing the proximity value with the proximity information. For example, the proximity value may be in the format of a threshold value, corresponding to a defined distance, so that the joining device is only allowed to join the network in case the proximity information provided by the joining device is below said threshold value, i.e. the joining device is closer than the defined distance. The predetermined proximity value may be hard-coded in the network device or comprised in a suitable memory, so that it is possible to adapt the proximity value according to the desired application.

According to a preferred embodiment of the invention, the network device comprises a proximity signal sender configured to provide a proximity signal. The joining device comprises a proximity detector and is configured to determine the strength of said proximity signal, so that the proximity information corresponds to the received signal strength of said proximity signal. The arrangement according to the present embodiment allows improved proximity detection, because the communication between sender and detector can be adapted specifically to proximity detection, independent to the communication and the communication protocol of the communication interfaces. Thus, a second communications channel is advantageously formed for determining the physical proximity of the devices, allowing an enhanced security in the commissioning mode. Preferably, the proximity information corresponds to the received signal strength (RSSI) of the received proximity signal.

The proximity signal sender and the detector may be of any suitable type, allowing the transmission of a signal to each other within a defined range. Preferably, the proximity signal sender is an infrared sender and the detector is an infrared detector.

Alternatively or additionally to the determination of proximity, it is preferred that the network device comprises predetermined code data. A secondary signal transmitter is provided to send a signal, which corresponds to said code data to said joining device. The joining device comprises a secondary signal receiver and upon reception of said signal, sends corresponding verification information to said network device over the wireless medium, i.e. using its communication interface. The network device then determines, whether said verification information corresponds to said code data and if this is the case, sends the joining information to the joining device, so that the joining device is added to the network system.

The secondary signal transmitter and receiver thus form a further communications channel, independent from the network communication, which allows a more secure communication and is thus a "trusted" channel. The code data may be considered as a "shared secret", so that only a joining device, receiving said code data and returning said code data correctly to the network device, i.e. in the form of said verification information, is allowed to join the network. The set-up of the present embodiment thus advantageously further enhances the security of the commissioning.

Alternatively to the above-mentioned and according to a preferred embodiment of the invention, the joining device may comprise said predetermined code data. According to the present embodiment, the joining device comprises a secondary signal transmitter and the network device comprises a secondary signal receiver. A signal corresponding to said code data is then transmitted to the network device using said secondary signal transmitter and receiver. In addition, verification information corresponding to said code data is transmitted to the network device over the wireless medium using the communication interface, so that the network device may determine whether said code data corresponds to said verification information.

Since the communication using the secondary signal transmitter and receiver is considered trusted, the present embodiment further enhances the security of the commissioning.

The code data and the verification information may be of any suitable type and format for allowing the above determination. For example, the code data and the verification information may be numerical values, randomly generated strings or any kind of security key, e.g. adapted for transmission on the trusted channel. Certainly, the code data and verification information need not to be identical, as long as the determination is possible whether the code data corresponds to said verification information.

In case the joining device comprises said code data, the predetermined code data preferably corresponds to said predefined address. The joining device thus "announces" its presence using the predefined address on said trusted channel. The verification information, i.e. the predefined address, is then sent to the network device over the wireless medium, so that the network device, once the request to join the network is received, is able to determine, if the joining device, which requests to join the network, has already announced its presence on the trusted channel and thus can be considered trustworthy.

The verification information may preferably be sent to the network device during commissioning comprised in the request to join the network, to reduce the time needed for commissioning and enhance the communication efficiency.

The secondary signal transmitter and the secondary signal receiver may be of any suitable type, allowing the transmission of a signal to each other within a defined range. Preferably, the secondary signal transmitter and the receiver are configured for wireless operation. For example, the secondary signal transmitter and the receiver may be configured for RF-communication, acoustical or optical communication.

According to a preferred embodiment of the invention, the transmission range of the secondary signal transmitter is less than the transmission range of the communication interface. Preferably, the transmission range is less than 20 m, most preferred equal to or less than 10 m.

According to a development of the invention, the secondary signal transmitter and the receiver are configured for "line-of-sight" only communication. At least the transmitter and/or the receiver may have a limited angular range of radiation or acceptance, respectively. Preferably the angular range is less than 10°, most preferred equal to or less than 5°. This embodiment enables a user to control the commissioning in an improved way. For example, it is thus possible to point the network device to the joining device, which is to be added to the network, providing "touch-link" functionality. This may be particularly advantageous in case many un-configured devices are present in the vicinity of the network device, but the user wants to select a specific and add this device to the network.

Most preferred, the secondary signal transmitter is an infrared transmitter and the secondary signal receiver is an infrared receiver. Such a set-up allows a cost-effective and reliable detection of the proximity of the devices and provides "line-of-sight" type operation.

The before described embodiments, based on the exchange of code data may be combined without restrictions with the embodiments, according to which the proximity of said joining device to the network device is determined.

According to the inventive method of commissioning a wireless network system with at least a network device and a joining device, said network device broadcasts network identification information and said joining device sends, upon reception of the network identification information, a request to said network device to join the network, comprising a predefined address of said joining device. Said network device assigns said joining device a network address and stores corresponding data. The network device sends joining information comprising at least said network address to said joining device using said predefined address and the joining device receives the network address, so that the joining device is addressable in the network system using said network address.

The above-mentioned object is further solved by a wireless network system corresponding to a second aspect of the present invention.

The basic idea of the second aspect of the invention is to provide a wireless network system in which a network device being part of a first network system may communicate with a joining device, being part of a second network system in a discovery mode. In the discovery mode, the network device broadcasts a discovery message, which upon reception causes the joining device of the second network system to enter a commissioning mode for joining said first network system, so that the joining device being addressable in said first network system. To enhance the security of the operation in said discovery mode, the joining device only enters said commissioning mode, in case a proximity condition is met, which is explained in detail in the following.

The current aspect of the present invention allows adding a joining device to the first network system, although the joining device is already configured for operation in a network system, i.e. the joining device is not a "virgin" or unconfigured device. It is thus advantageously not necessary for a user to disconnect the joining device explicitly from the second network system, e.g. by conducting a tedious disassociation procedure and therefore enhances the usability of the wireless network system, enabling a secure and convenient plug-and-play behavior.

The wireless network system according to the present aspect of the invention comprises at least a network device and joining device, each having a communication interface for transmitting and receiving data over a wireless medium, which is preferably a shared medium. The communication interface may be of any suitable type, for example an optical communication interface, although preferably, the communication interface is a radio frequency (RF) communication interface, most preferred configured for communication with a standard communication protocol, such as IEEE 802.11 or IEEE 802.15.4.

The network device is configured for operation in the first network system, while the joining device is configured for operation in the second network system, i.e. the devices are configured for communication in different networks, e.g. in a network communication mode for communication with other devices of the respective network.

In the context of the present invention, the term "network system" may refer to a logical network of one or more devices, which are able to communicate with each other using defined network addresses. The first and second network system may for example be personal area networks ("PANs"), each having unique network identification information, e.g. a PAN-ID, allowing to reliably and uniquely identify the respective network system at least in its physical vicinity.

According to the invention, the joining device is configured at least with a network address for being addressable in the second network system. The network device may also be configured with a network address for communication in the first network system, however a network address may not be necessary, for example in case the first network system is only formed by said network device before commissioning.

Certainly and depending on the respective communications protocol used, the devices may be provided with further parameters for network communication in each respective network, such as for example information relating to network security, such as a security key for an encrypted communication, a channel number, e.g. MAC channel choices, arbitration information for dealing with network-ID collisions or a defined communications mode.

The network address may be of any suitable kind to enable that the device in the respective network system is individually addressable. The format and length of the network address may depend on the specific communications protocol used and, with regard to the length of the network address, i.e. the available address range, certainly on the number of devices in the network. Since it is only needed to address the devices, being part of the network individually, a "network-wide" unique address is preferred.

The network address and the eventual further parameters may be hard coded, e.g. a factory-set, or programmed in a suitable memory of the respective device. The joining device further comprises a predetermined proximity value, which is described in detail in the following.

The network device and the joining device may certainly comprise further components, such as for example a power supply, e.g. a battery or a mains-connected power supply unit, a processor unit, a user interface or memory. Preferably, the network device and/or the joining device each comprise a central processing unit, adapted at least to send/receive commands over the communication interface and implementing at least part of the behavior of the respective device, for example using a suitable programming, comprised in the memory.

According to the invention, the network device and the joining device are configured to operate at least in a discovery mode, in which the network device broadcasts a discovery message in the wireless medium which provides proximity information. The proximity information corresponds to the distance between the network device and the joining device. The joining device, which receives the discovery message is configured to determine whether said proximity information corresponds to the predetermined proximity value. In case the proximity information corresponds to the proximity value, the joining device enters a commissioning mode, so that the joining device is addressable in the first network system.

In the commissioning mode, the joining device is programmed with "joining information" comprising at least a network address for communication in the first network system. Depending on the communications protocol of the network system, the joining information may comprise further parameters, needed for communication in the first network system. For example, such parameters may comprise information relating to network security, such as a security key for an encrypted communication, a channel number, e.g. MAC channel choices, arbitration information for dealing with network-ID collisions or a defined communications mode, depending on the communications protocol of the network system.

In case the network devices comprises and issues at least a security key, the network device may preferably correspond to a trust center. The joining information may be transmitted to the joining device during or prior to the commissioning mode, e.g. by said first network device or a further device of said first network system.

Subsequent to the commissioning, the joining device is considered a member of the first network system and both devices are then able to operate and communicate with each other and eventual further devices in said first network system.

The discovery mode may be initiated by a user, for example by press of a corresponding "discovery" button on the network device and/or on the joining device. Preferably, the network device and/or the joining device are permanently in said discovery mode during operation, so that no user interaction is needed, which further increases the plug-and-play behavior of the wireless network system.

The proximity information may include all information, allowing determining the physical distance between the joining device and the network device. The proximity information may preferably correspond to the signal strength of a communication of the network device sent to the joining device, e.g. the signal strength of the discovery message, thus being inherently comprised in the discovery message.

The predetermined proximity value may be of any suitable kind, allowing comparing the proximity value with the proximity information. For example, the proximity value may be in the format of a threshold value, corresponding to a defined distance, so that the joining device only enters the commissioning mode, in case the proximity information is below said threshold value, i.e. the network device is closer to the joining device than the defined distance. The predetermined proximity value may be hard-coded in the joining device or comprised in a suitable memory, so that it is possible to adapt the proximity value according to the desired application. Preferably, the proximity value is a proximity threshold, corresponding to a distance of less than 2 meters, most preferred less than 0.5 meters, so that the commissioning mode is only entered in case said network device is closer than the defined proximity threshold to the joining device.

As already described above, the communication interfaces of the network device and the joining device may be configured for use in standard network systems. The communication in the discovery mode may therefore correspond to any suitable communication protocol known today according to which a wireless communication may be established. A suitable group of preferred communication protocols for implementing the present aspect of the invention are usually referred to as ad-hoc wireless network systems.

A particularly suitable and preferred communication protocol for implementing the present invention is Zigbee. Therefore, the communication interfaces are most preferably configured for use in a Zigbee network system. Although the invention is not limited thereto, it is explained in the following referring to Zigbee for illustration purposes.

Zigbee is an open standard and is based on the IEEE 802.15.4 communications protocol, which defines a physical link layer (PHY) and a media access control layer (MAC). Zigbee uses this protocol and defines a network layer (NWK) and an application layer (APL) on top of the MAC-layer, provided by IEEE 802.15.4. A description of Zigbee and the Zigbee protocol stack is disclosed in the Zigbee specification, e.g. in document 053474r17, describing "Zigbee 2007", dated Oct. 19, 2007, available from the Zigbee Alliance Inc.

Referring to Zigbee, said network address preferably corresponds to a Zigbee short network address. Said network identification information preferably corresponds to a Zigbee PAN-ID, most preferred to an extended PAN-ID.

According to a preferred embodiment of the invention, the network device is an end device. In the context of the present invention, an "end device" is a network device, which has no routing capabilities and which is not necessarily permanently active in the network system. The device may be in a "dormant" or sleep mode for long periods and only activate, when a transmission is required. Its overall power consumption is thus dramatically reduced. Preferably, the network device corresponds to a Zigbee end device and most preferably, the network device is a reduced function device (RFD), according to Zigbee.

According to a preferred embodiment of the invention, the network device is a mobile device, wherein the term "mobile" is understood to include devices, which are easily transportable by hand, i.e. having an adequate size and weight. Preferably said mobile device is not mains-connected, e.g. having a battery or other suitable power supply.

According to a development of the invention, the network device is a first control device further comprising a user control interface for sending an application control command to and/or receiving an application data value from of a further device in the first network system. In the context of the present invention the term "user control interface" is understood to comprise any interface for user interaction, like an input interface for the initiation of an application control command to be sent or a display device for display of said application data value. For example, the user control interface may comprise several buttons and/or an LCD-display.

The application control command may be any kind of command for controlling an application device, for example for switching on and off a lighting unit, connected to a device in the network, and is in contrast to a network control command, intended for network configuration or network management purposes. The same applies to the application data value, which may exemplary comprise a sensor reading of a connected sensor.

With reference to wireless networks such as Zigbee, said application control command and application data value refers to a communication on the application layer and may correspond to an application object.

According to the set-up of the present embodiment, the first control device advantageously provides the above explained discovery functionality in the discovery mode and furthermore application functionality, i.e. sending application control commands or receiving application data values in the network communication mode. Thus, no further dedicated device is needed in the network system for application control, which advantageously reduces the complexity of the network system and further enhances the operability for a user.

The first control device according to the present embodiment may be a computer or a simple wall switch, but preferably is a battery-operated remote control.

According to a development of the invention, the joining device is a function device comprising an application interface, configured to receive said application control command and/or to send said application data value. The application interface is connectable to an application device, e.g. for performing a controlling, switching or sensor function. The application device may be of any suitable kind, such as a lighting unit, a heating device or any type of electrically controllable device. For example in the case of a connected lighting unit, the application interface may be configured to switch the lighting unit on and off or to dim the lighting unit upon reception of the corresponding application control command Further, the application interface may alternatively or additionally be configured to send an application data value of a connected application device, for example a temperature reading of a temperature sensor, the reading of a water or electricity meter or an alert of a smoke or fire detector.

Preferably, said function device is integrated with the application device, e.g. with a lighting unit.

Especially in extensive wireless network systems having a large number of devices, it may be necessary to provide more than one control device to enable a further enhanced operability. According to a preferred embodiment, the joining device is a second control device comprising a user control interface for sending an application control command to and/or receiving an application data value from further devices in the network.

Since in the discovery mode, a network communication may not be possible, for example in case the network communication is encrypted, it is preferred that in the discovery mode, the communication interfaces of the network device and the joining device are configured for out-of-network communication.

According to a preferred embodiment of the invention and referring to Zigbee, the discovery message corresponds to a Zigbee global PAN-ID transmission, as described in document 053474r17, describing "Zigbee 2007" and dated Oct. 19, 2007, available from the Zigbee Alliance Inc. Global PAN-ID transmission frames are addressed with a specific and reserved PAN number, e.g. DstPANID=0xFFFF, so that such transmission frames are routed to and may be received by every device in the transmission range. It is thus possible to communicate between devices which do not necessarily have to be in the same Zigbee network, i.e. providing out-of-network communication.

Alternatively or additionally and according to a development of the present aspect of the invention, the discovery message corresponds to a Zigbee Inter-PAN transmission. Zigbee Inter-PAN transmissions are defined in the Zigbee smart energy profile, as disclosed in document 075356r14, dated May 29, 2008, available from the Zigbee Alliance Inc.

Using Zigbee Inter-PAN transmissions it is possible for a network device to exchange information with a further device, which does not necessarily have to be part of the same Zigbee network, in a limited way.

The format of a Zigbee Inter-PAN transmission frame usually does not comprise a network address in the NWK layer, but is addressed with the MAC-address of the desired destination device. The use of Zigbee Inter-PAN transmissions is especially useful since it allows a reliable communication between devices of different Zigbee networks, i.e. the network device and the joining device prior to commissioning, without the need to "open" the Zigbee network, i.e. to temporarily disable the security measures to add the joining device.

Certainly, the further communication in the commissioning mode may also preferably be carried out using Zigbee global PAN-ID and/or Inter-PAN transmissions respectively.

According to a development of the invention, the joining device comprises a device configuration memory for storing at least said network address. In case said proximity information corresponds to said proximity value, the joining device is configured to reset the device configuration memory.

The present development of the invention advantageously provides that the joining device is safely removed from the previous network system in the discovery mode, i.e. from the second network system. The device configuration memory comprises at least said network address of said second network system, but may certainly comprise any further parameters for communication in said second network system, as discussed above, so that the entire parameters for communication in said second network system are removed in case the proximity condition is met.

The reset may be conducted by any suitable method, e.g. by erasing or overwriting said device configuration memory.

The device configuration memory is preferably a variable memory, so that the joining information may be stored in said device configuration memory. Most preferred, the device configuration memory is reset prior to entering the commissioning mode, so that the settings of the previous network system are safely removed prior to the commissioning in said commissioning mode.

Most preferably, the joining device is configured to send a "leave message" in the second network system prior to the reset, so that any further device in said second network system may delete the joining device from its device table.

Referring to Zigbee, the leave message preferably corresponds to an NLME-LEAVE.request.

As discussed above, in said commissioning mode, the joining device is programmed with joining information, comprising at least a network address for operation in the first network system. The joining device is then considered a member of the first network system.

The joining information may e.g. be comprised in a "joining message", e.g. a communication of said first network device to the joining device, sent during or prior to commissioning.

Alternatively and according to a preferred embodiment, the network device and the joining device may be configured for communicating in the commissioning mode according to the first aspect of the invention, in which said network device being configured to broadcast network identification information, said joining device being configured upon reception of said broadcast to send a request to join the network comprising a predefined address to said network device, said network device being configured to respond said request by assigning a network address to said joining device, to store data corresponding to said network address in a network configuration memory and to send joining information comprising at least said network address to said joining device using said predefined address and said joining device being configured to receive said joining information and to store said joining information in said device configuration memory, so that said joining device is addressable in the network system using said network address.

As discussed above, said network identification information allows to reliably and uniquely identify the first network system at least in its physical vicinity. Preferably, the network identification information is a unique identifier of the first network system, most preferably a factory-set unique identifier. For example, the network identification information may be a universally unique identifier (UUID) of the network device itself, usually based on the IEEE MAC-address, e.g. a 6-Byte device identifier. The network identification information may be hard-coded in the network device or may be comprised in a variable memory. Preferably, the network identification information is stored in the network configuration memory.

The predefined address may be any kind of information, allowing individualizing said joining device. For example, the predefined address may be a factory-set address. Preferably, the predefined address is a MAC-address. The predefined address may be hard-coded, e.g. in the communication interface or comprised in a suitable memory.

According to a preferred embodiment, said network identification information of said first network system is further comprised in said discovery message, so that in the commissioning mode, the joining device only returns said request to join the network in case the network identification information, received during the commissioning corresponds to the network identification information, comprised in said discovery message. The present embodiment advantageously enables that the joining device only joins said first network system, especially in case multiple network systems are present in its vicinity, so that an eventual misconfiguration can be avoided.

Additionally or alternatively to the above and according to a further preferred embodiment of the invention, the joining device is configured in said commissioning mode to broadcast said proximity information together with said predefined address of the joining device. Preferably, the network device is configured upon reception of said broadcast of the joining device to send a reset message addressed with said predefined address to the joining device. Most preferred, the joining device is configured upon reception of said reset message to reset its device configuration memory and to restart using the joining information for communication in said first network system.

The present embodiment is especially advantageous, in case more than one device is in proximity to the network device, so that it may be necessary to explicitly chose a device to be commissioned. The network device may therefore e.g. be configured to display a list of the devices in its proximity with the respective predefined addresses, so that the user may choose a specific device, which triggers the reset message to be sent to the chosen device with the corresponding predefined addresses. Alternatively, the network device may be configured to automatically pick the device closest to the network device, determined from said proximity information.

Referring to the above embodiment, said joining information may e.g. be transmitted to the joining device in a communication according to the first aspect of the invention, discussed above. Preferably, the network device is configured to send said joining information in said reset message, so that the joining device, upon reception of said reset message, resets its device configuration memory, i.e. overwrites said device configuration memory with said joining information and then restarts.

Once the commissioning is complete, the joining device may preferably be configured to announce its presence in said first network system, e.g. with a network-wide broadcast or an announcement broadcast comprising at least its network address.

Further advantageous embodiments are mentioned in the dependent claims.

BRIEF DESCRIPTION OF THE DRAWINGS

The above and other objects, features and advantages of the present invention will become apparent from the following description of preferred embodiments, in which:

FIG. 10a shows a third embodiment of a network device in a schematic view and

FIG. 10b shows a seventh embodiment of a joining device in a schematic view,

FIG. 11 shows a schematic drawing of a further embodiment of a wireless network system according to a second aspect of the invention.

DETAILED DESCRIPTION OF EMBODIMENTS

Figure 1:
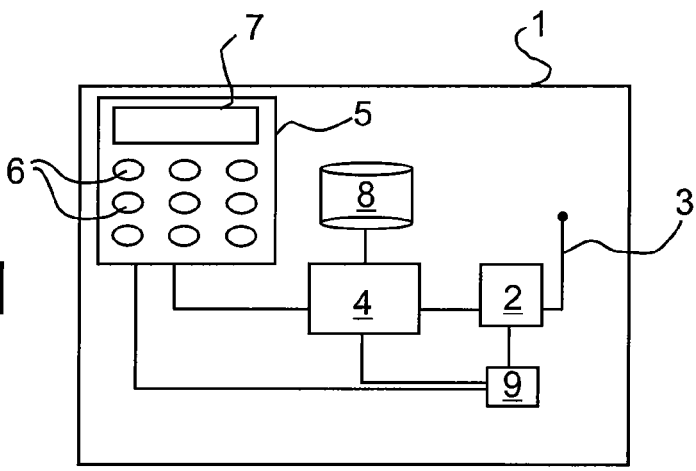
FIG. 1 shows a first embodiment of a network device in a schematic view.

FIG. 1 shows a first embodiment of a network device 1, in the present example a remote control device in a schematic representation. The network device 1 comprises a communication interface 2 with a suitable antenna 3, provided for radio-frequency wireless communication according to the Zigbee and IEEE 802.15.4 communication protocols, in the following referred to as 'Zigbee' or Zigbee protocol. IEEE 802.15.4 provides a physical link layer (PHY) and a media access control layer (MAC). Zigbee provides a network layer (NWK) and an application layer (APL) on top of the MAC-layer. A description of Zigbee and the Zigbee protocol stack is disclosed in the Zigbee specification, e.g. in document 053474r17, dated Oct. 19, 2007, available from the Zigbee Alliance Inc. As explained in the following, the communication interface 2 further implements the Zigbee Pro stack profile. An explanation of Zigbee Pro and a corresponding communications stack is disclosed in document 074855r05, dated January 2008, available from the Zigbee Alliance Inc.

The communication interface 2 is connected to a CPU (central processing unit) 4, which controls the communication over the communication interface 2 using, e.g. a microcontroller with a suitable programming. The CPU 4 is connected with a user control interface 5, having buttons 6 and an LCD display 7 for application and network control functions, as explained further below. A variable network configuration memory 8 is provided for storing network addresses and network configuration data. A battery 9 supplies all components of the network device 1 with electrical power. The network device 1 is a Zigbee end-device, sometimes referred to as reduced functionality device (RFD), and is dormant when no communication is needed, thus saving battery power.

The network device 1 may communicate to other wireless devices over the communication interface 2, forming a communications network using the Zigbee protocol, which provides network functionality, including addressing, medium access, routing capabilities, etc.

In a Zigbee network, each of the devices is uniquely addressable with a short network address, which is a 16-Bit network-wide unique identifier for communication on the network layer (NWK). When a network is started or a new device joins the network, it is necessary to commission the network, i.e. to at least assign the device a network address, to be able to communicate in the network system.

To start a network system 30, the network device 1 is programmed with network configuration data. The network configuration data may be automatically generated by the CPU 4 when the network device 1 is activated for the first time. Alternatively, the network configuration data may be factory-set or entered using the user control interface 5.

In the present example, the network configuration data comprises a personal area network identifier (PAN-ID), so that the network system 30 is distinguishable from other network systems in its vicinity. Referring to Zigbee, the PAN-ID may be supplemented with an Extended PAN-ID, which usually is a 64-Bit "globally" unique identifier of the network system 30. Further a channel for network communication is chosen. Additionally, a network key is generated for secure communications. For example, the network key according to Zigbee HAP is based on AES with a length of 128 Bit. The key may be generated using e.g. a random number generator and/or may be based on the MAC-address of the network device 1.

Figure 3:
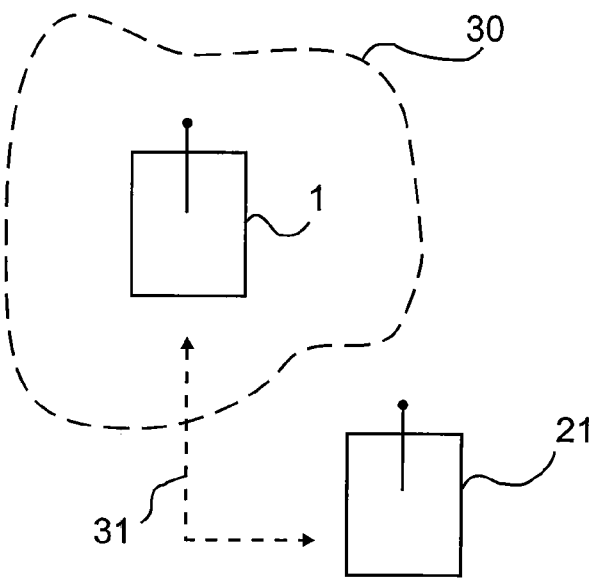
FIG. 3 shows a schematic drawing of an embodiment of a wireless network system before commissioning.

Additionally, an address range may be predefined, as explained in the following. The thus created network configuration data is stored in the network configuration memory 8, which then comprises the following information:
Network configuration data
PAN-ID
Extended PAN-ID
Network Key
Channel No.
(Address range) optional It should be noted that in a broad sense and before any commissioning, the network 30 is only formed by the network device 1, as shown in FIG. 3. In terms of the present explanation, the communication in the network and the membership of a device in a network system refers to a communication using a network address, defined on the network layer (NWK), e.g. a Zigbee short network address.

Figure 2:
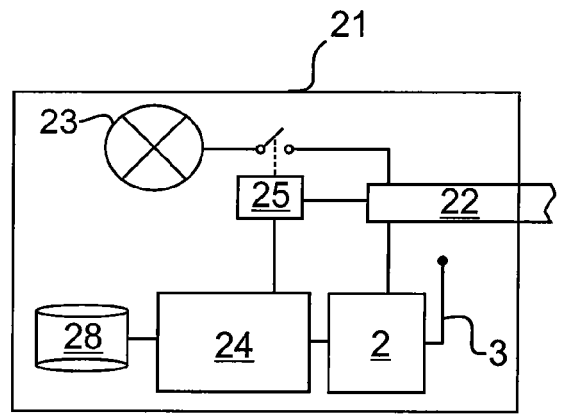
FIG. 2 shows a first embodiment of a joining device in a schematic view.

In the following it is assumed, that a new device, i.e. a joining device 21 is to be added to the network, which is shown in FIG. 2 in a schematic view according to a first embodiment.

In the present example, the joining device 21 is a lighting unit. The joining device 21 comprises, correspondingly to the network device 1, a communication interface 2, provided for wireless RF-communication according to Zigbee. The communication interface 2 comprises a unique MAC-address for communication on the MAC-layer and is connected to a CPU 24, which controls the communication. The CPU 24 is connected to a device configuration memory 28 and an application interface 25, which is arranged to control a lamp 23, i.e. to switch the lamp 23 on and off and to dim the lamp 23. The application interface 25 is controllable over the network upon reception of an application control command from a remote control device, such as the network device 1. All components are connected to a power-supply unit 22, having a mains connection (not shown).

When the joining device 21 is activated for the first time or the device is reset, which is usually referred to as a "virgin" device, the device configuration memory 28 is empty, i.e. joining device 21 is not configured, and does not have a dedicated network address, needed for network communication.

Upon activation, the CPU 24 polls the device configuration memory 28 and enters a commissioning mode, when said device configuration memory 28 is empty. In the commissioning mode, the joining device 21 obtains joining information 42 from the network device 1, so that the joining device 21 is addressable in the network system 30, i.e. then is a member of the network system 30. For the network device 1, the commissioning mode is initiated upon a user operation, e.g. a button-press of a corresponding "join mode" button on the user control interface 5.

Figure 4:
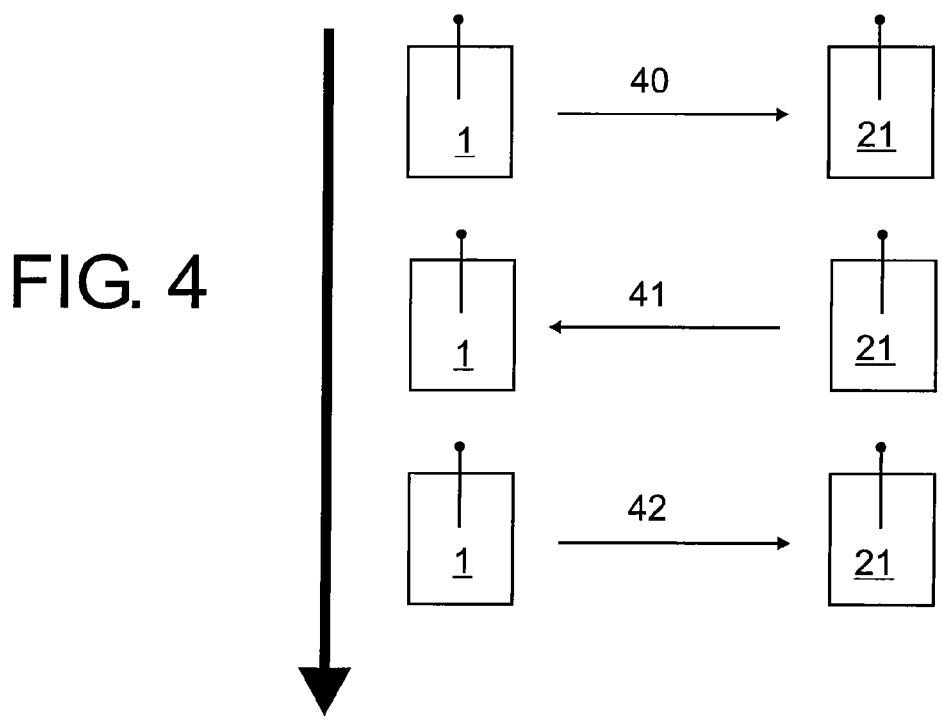
FIG. 4 shows an embodiment of the communication during the commissioning mode in a symbolical representation.

An embodiment of the communication in the commissioning mode between network device 1 and joining device 21 is shown in FIG. 4 in a symbolical representation.

During the commissioning mode, the communication interfaces 2 of the network device 1 and the joining device 21 are driven by the respective CPUs 4 and 24 to communicate in a Zigbee Inter-PAN transmission mode, which allows the network device 1 to exchange information with the joining device 21 without the need of having a previously set-up Zigbee network. As already mentioned, the joining device 21 does not have a network address, i.e. a short network address on the NWK-layer, and further, the joining device 21 does not have the network key, needed for communicating in the network system 30. A Zigbee Inter-PAN transmission may thus be considered as an out-of-network communication channel 31, as shown in FIG. 3.

Figure 5:
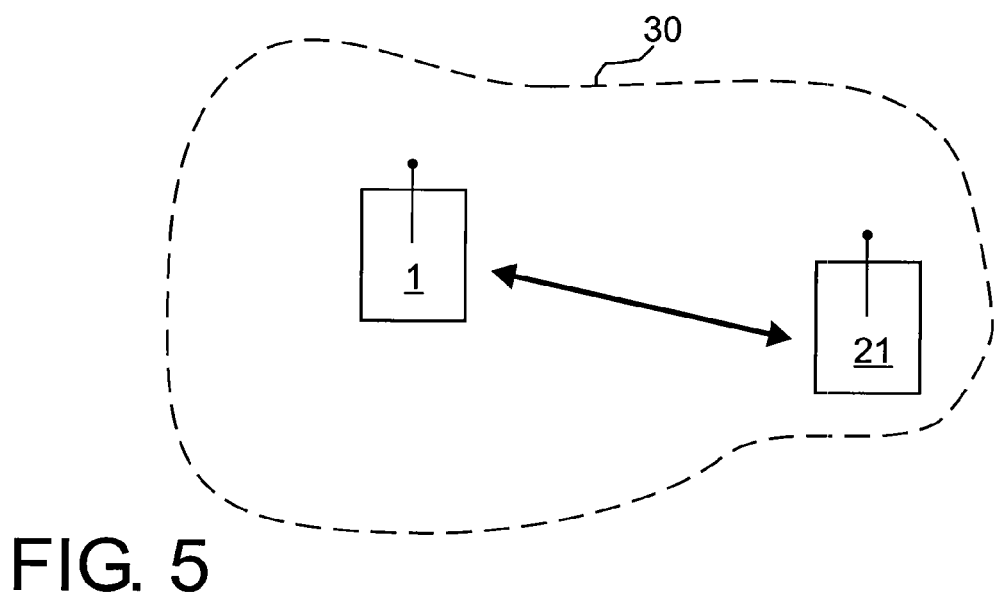
FIG. 5 shows a schematic drawing of a second embodiment of a wireless network system after the successful commissioning.

Zigbee Inter-PAN Transmissions are defined in the "Zigbee smart energy profile", as disclosed in document 075356r14, dated May 29, 2008, available from the Zigbee Alliance Inc. Inter-PAN transmission requests are normally handled in the Zigbee stack by a special "Stub" of the application support sub-layer, which performs just enough processing to pass application frames directly to the MAC-layer without involvement of the NWK-layer and to pass received Inter-PAN application frames from the MAC-layer directly to the application. The commissioning according to the present example is implemented according to the following steps, where all messages are sent in corresponding Zigbee Inter-PAN transmissions:

1. Upon initiation of the commissioning mode, the network device 1 sends a broadcast message 40, comprising the PAN-ID, stored in the network configuration memory 8.
2. The joining device 21, entered the commissioning mode as explained before, receives said broadcast message 40 and broadcasts a request 41 to join the network, comprising its MAC-address.
3. The network device 1 receives said request 41, assigns the joining device 21 a short network address, stores the short network address in the network configuration memory 8 and sends joining information 42, comprising the short network address, Extended PAN-ID, Network Key and Channel No. to the joining device 21.
4. The joining device 21 receives and stores the joining information 42 in the device configuration memory 28 and restarts using the joining information 42 for configuration of the communication interface 2 and the CPU 24. The joining device 21 is now a regular member of the network system 30 and is addressable in the network system 30. As shown in FIG. 5, the network device 1 and the joining device 21 are able to communicate with each other in the network system 30. The commissioning ends.

After a successful commissioning, the network configuration memory 8 comprises the following information:
Network configuration data
PAN-ID
Extended PAN-ID
Network Key
Channel No.
(Address range) optional
Network devices
Short Network address #1 (network device 1)
Short Network address #2 (joining device 21)

Once the joining device 21 has joined the network 30, the application interface 25 and thus the lamp 23 is controllable using the user control interface 5 of the network device 1. A button 6 of the network device 1 may be assigned for controlling the specific application interface 25, which is usually referred to as binding. Methods for binding are known in the art, an example is disclosed in the Zigbee specification.

A set-up according to the present example is advantageous, since a dedicated coordinating device is not needed. Commissioning and application control functionality is provided by a single network device 1.

In the previously described commissioning mode, the network device 1 assigns the joining device 21 a short network address. The short network address may be determined from a predefined network address space, as mentioned before. In the present example of a Zigbee network, the short network address is a 16-bit address, so that a total of 65.536 short addresses are assignable. In the present example, the network device 1 holds the address number "1" and assigns the joining device 21 the next consecutive address "2". Further added devices are assigned an address accordingly. As mentioned, the network device 1 uses the Zigbee Pro stack profile, which enables a "flat" address assignment, in contrast to a hierarchical address distribution.

Figure 6:
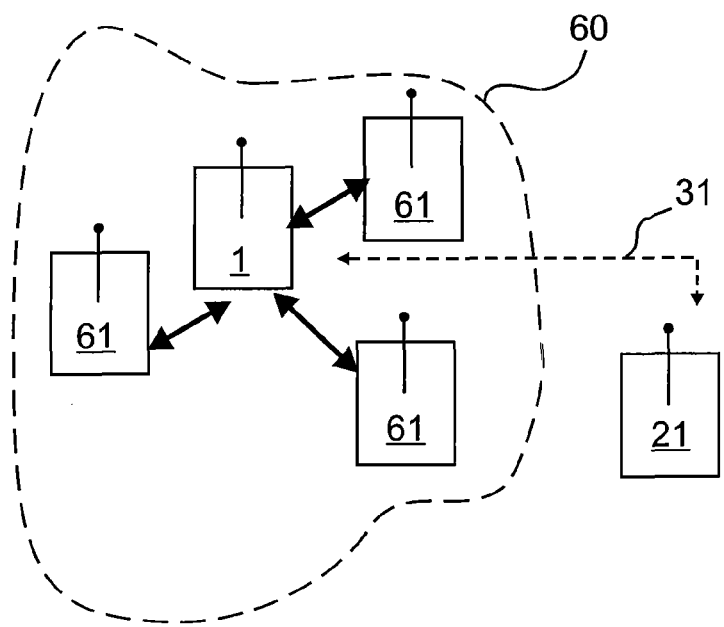
FIG. 6 shows a schematic drawing of a further embodiment of a wireless network system.

Certainly, the above explained commissioning is not limited to the start of a network system and may also be conducted to add the joining device 21 to a network system 60, already comprising multiple commissioned devices 61, as shown in FIG. 6. In the present example, the network configuration memory 8 of the network device 1 comprises the following information:
Network configuration data
PAN-ID
Extended PAN-ID
Network Key
Channel No.
(Address range) optional
Network devices
Short Network address #1 (network device 1)
Short Network address #2
Short Network address #3
Short Network address #4

In the example of FIG. 6, a Short Network address #5 of the joining device 21 is comprised in the network configuration memory 8 after the commissioning is complete.

To remove a device from the network 30, a corresponding request is sent upon user interaction from the network device 1 to the respective joined device 21, which resets its device configuration memory 28 and restarts. The corresponding short network address is then deleted from the network configuration memory 8 and is assignable to a new device.

Figure 7A:
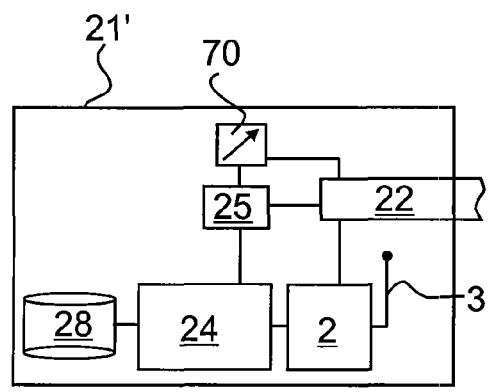
FIG. 7a shows a second embodiment of a joining device in a schematic view.
Figure 7B:
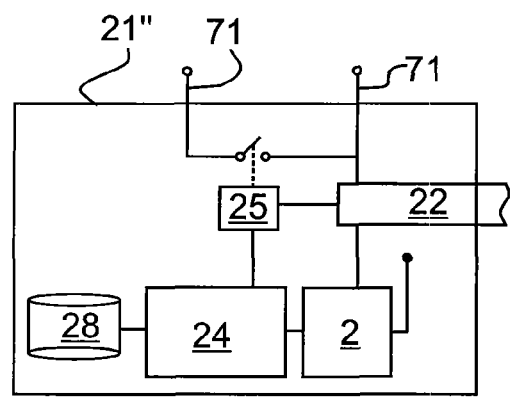
FIG. 7b shows a third embodiment of a joining device in a schematic view.

The commissioning according to the present example is not limited to adding joining devices 21 having a lamp 27. FIG. 7*a* shows a second embodiment of a joining device 21', which is identical in all aspects to the joining device 21, with the exception that instead of the lamp 23, a temperature sensor 70 is connected with the application interface 25, for providing a corresponding application data value to the network device 1, which is then shown to the user on the display 7 of the network device 1. FIG. 7*b* shows a third embodiment of a joining device 21", which is also identical to the previously described joining device 21, with the exception that the application interface 25 is configured to control an external appliance, connectable to the terminals 71. For example, the appliance may be a household appliance, like a heating device, enabling to remotely switch the appliance on and off using a corresponding button 6 on the user control interface 5 of the network device 1. In the examples of FIGS. 7*a* and 7*b*, the commissioning corresponds to the method, explained before.

Figure 7C:
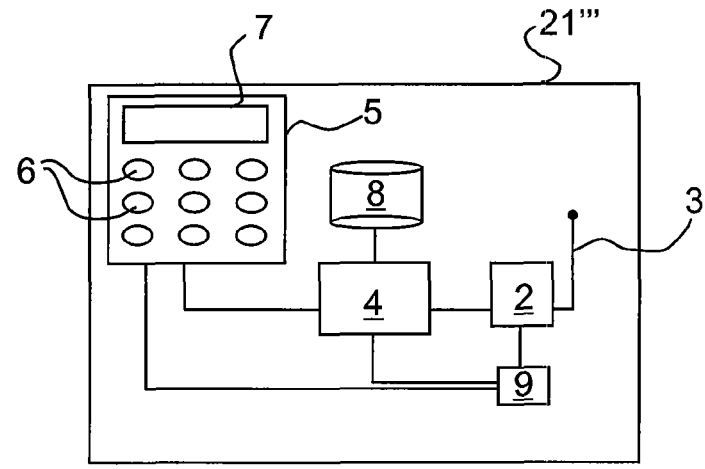
FIG. 7c shows a fourth embodiment of a joining device in a schematic view.

A further embodiment of a joining device 21''' is shown in FIG. 7*c*, in the present example a second remote control device, corresponding to the remote control device, shown in FIG. 1. Corresponding elements are designated in FIG. 7*c* with the numerals of FIG. 1. Especially in network systems, having a large number of devices, it is advantageous to add further remote control devices to the network, so that the joined remote control device may itself initiate the commissioning mode and communicate with further joining devices. The commissioning according to the present embodiment corresponds to the commissioning, explained with reference to FIG. 4, except that the joining information 42, send to the joining device 21''' in step 3, comprises an address range, so that the joining device 21''' is able to start the commissioning to let further devices join the network.

As explained above, the network device 1 assigns the joining device 21''' a network address, i.e. address number 2. Additionally, the network device 1 assigns the joining device 21''' an address range for commissioning once joined the network 30. Assuming, that it is impractical to control more than 1000 devices with a single remote control device, the network device 1 assigns the joining device 21''' a network range of 1000 addresses, e.g. addresses no. 3-1002 and marks these addresses as being occupied. The network configuration memory 8 of the network device 1 then comprises the following information:
 Network configuration data
 PAN-ID
 Extended PAN-ID
 Network Key
 Channel No.
 (Address range) optional
 Network devices
 Short network address #1 (network device 1)
 Short Network address #2 (joining device 21''')
 Short Network addresses #3—#1002 assigned to No.#2 (occupied)

The assigned address range is stored in the network configuration memory 8 of the joining device 21''' upon reception and used for further commissioning, so that new joining devices are assigned an address from the address range. The network configuration memory 8 of the joining device 21''' then comprises the following information:
 Network configuration data
 PAN-ID
 Extended PAN-ID
 Network Key
 Channel No.
 Address range: #3-#1002
 Network devices
 Short Network address #1 (joining device 21''')

Figure 8:
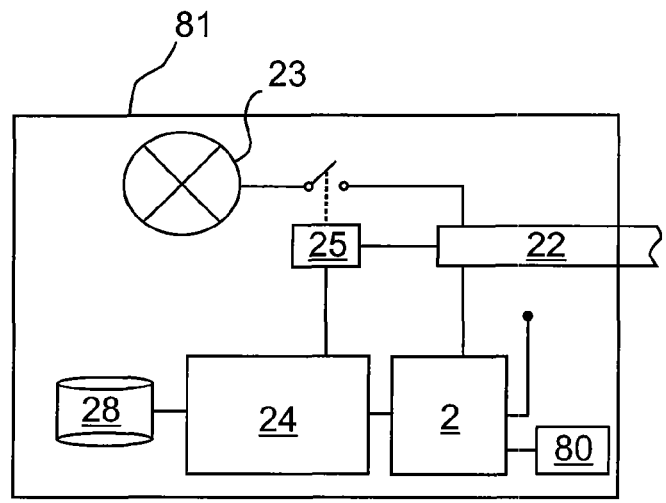
FIG. 8 shows a fifth embodiment of a joining device in a schematic view.

FIG. 8 shows a further embodiment of a joining device 81 which corresponds to the joining device 21 with the exception, that a signal strength detector 80 is connected to the communication interface 2 for determining the received signal strength of an incoming communication and to provide a received signal strength indication (RS SI) to the network device 1. The present embodiment advantageously enhances the security of the network system 30.

The operation in the commissioning mode corresponds to the operation explained before with reference to FIG. 4, with the exception that in step 2, the joining device 81 determines the signal strength of the received broadcast of the network device 1 using the signal strength detector 80 and sends a corresponding RSSI to the network device 1.

In the present example, the network configuration memory 8 of the network device 1 comprises a predefined threshold value. The network device 1 then determines in step 3, whether the RSSI is equal or higher than a predefined threshold value. The joining information 42 in step 3 of the commissioning mode is then only sent to the joining device 81 in case the RSSI is equal to or higher than the predefined threshold value.

Figures 9A, 9B:
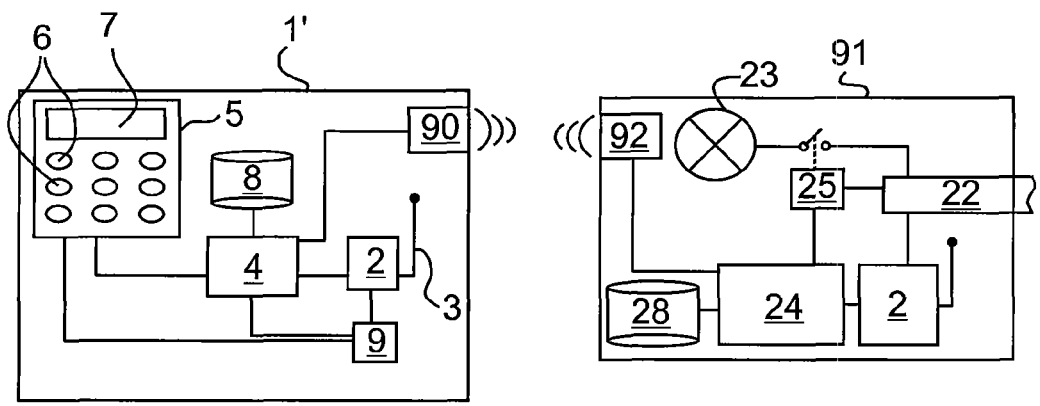
FIG. 9a shows a second embodiment of a network device in a schematic view.
FIG. 9b shows a sixth embodiment of a joining device in a schematic view.

A further embodiment of a network device 1' and a joining device 91 is shown in FIGS. 9a and 9b. The network device 1' and the joining device 91 correspond to the network device 1 according to FIG. 1 and the joining device 21 according to FIG. 2, with the exception that the network device 1' comprises an infrared transmitter 90 and the joining device 91 comprises an infrared receiver 92. The infrared transmitter 90 is connected to the CPU 4 while the infrared receiver 92 is connected to the CPU 24. The arrangement of transmitter 90 and receiver 92 allows a communication between network device 1' and joining device 91 separately from the network, forming a trusted communications channel. Both, transmitter 90 and receiver 92 are configured for "line-of-sight" communication with a range of approximately 10 m. The receiver 92 of the joining device 91 is of omni-directional type, i.e. has a wide acceptance angle. The transmitter 90 of the network device 1' exhibits an angle of radiation of about 5°. Because of the limited range and angle of radiation, the trusted communications channel is considered secure, allowing a secure exchange of a shared secret code between network device 1' and joining device 91.

Furthermore, it is possible for a user to direct the network device 1 to the joining device 91 which is to be added to the network, so that a "touch-link" or pointing selection of the joining device 91 is possible, in case multiple un-configured devices are present in the vicinity of the network device 1.

The commissioning according to the present embodiment is identical to the commissioning as explained with reference to FIG. 4, with the exception that the network device 1' in step 1 drives the infrared transmitter 90 to emit a signal comprising a secret code, e.g. a numerical sequence, parallel to the broadcast of step 1.

The joining device 91, which receives said code using the infrared receiver 92, sends the code in the request 41 to the network device 1'.

In step 3, the network device 1' determines whether the received code corresponds to the send code and if this is the case, sends the joining information 42 to the joining device 91.

An alternative embodiment of a network device 1" and a joining device 101 is shown in FIGS. 10a and 10b. The network device 1" and the joining device 101 correspond substantially to the network device 1' and joining device 91 of the embodiment according to FIGS. 9a and 9b. In the present example, the joining device 101 comprises an infrared transmitter 100 and the network device 1" comprises an infrared receiver 102. The transmitter 100 is of omnidirectional type. The receiver 102 shows a limited acceptance angle of approximately 5° to realize the above mentioned "touch-link" or pointing behaviour. Both, transmitter 100 and receiver 102 are configured for "line-of-sight" communication with a range of approximately 10 m.

The commissioning according to the present embodiment is identical to the commissioning as explained with reference to FIG. 4, with the exception that the joining device 101 in step 2 drives the infrared transmitter 100 to emit a signal comprising its MAC-address, parallel to the broadcast of request 41.

The network device 1" receives said signal using the infrared receiver 102 and in step 3, the network device 1" determines whether the received signal, i.e. the thus received MAC-address, corresponds to the MAC-address of the request 41 and if this is the case sends the joining information 42 to the joining device 101.

Alternatively to the above, the receiver 102 may have a wide acceptance angle and is configured to provide directional information to the CPU 4, which then determines, whether the network device 1" points to the joining device 101, i.e. if the joining device 101 is in a frontal section of the network device 1". In this case, the receiver 102 may have multiple IR photodiodes, which are arranged correspondingly to provide a resolution of 50 cm at a distance of 10 m.

As mentioned above with reference to FIG. 2, the CPU 24 of the joining device 21 enters the commissioning mode automatically, in case the device configuration memory 28 is empty. Alternatively or additionally, the joining device 21 may be configured to enter the commissioning mode in case the network device 1 is in a defined proximity to the joining device 21. Such a configuration may be especially advantageous, in case the joining device 21 is already configured for network communication, i.e. its device configuration memory 8 is not empty, so that it is not necessary to explicitly remove the joining device 21 from its previous network, in case a reconfiguration is needed.

FIG. 11 shows a schematic drawing of a further embodiment of a wireless network system according to a second aspect of the invention. In the following, it is assumed, that a new device, i.e. a joining device 111 is to be added to the first network system 30.

Figure 12:
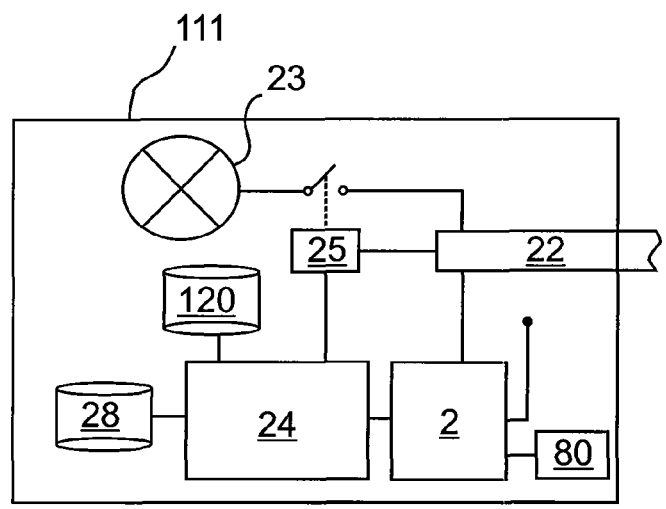
FIG. 12 shows an eighth embodiment of a joining device in a schematic view.

In the present example, the joining device 111 is a lighting unit, which is shown in FIG. 12 in a schematic view according to an eighth embodiment. The joining device 21 comprises, correspondingly to the network device 1, a communication interface 2, provided for wireless RF-communication according to Zigbee. The communication interface 2 comprises a unique MAC-address for communication on the MAC-layer and is connected to a CPU 24, which controls the communication. The CPU 24 is connected to a device configuration memory 28 and an application interface 25, which is arranged to control a lamp 23, i.e. to switch the lamp 23 on and off and to dim the lamp 23. The application interface 25 is controllable over the network upon reception of an application control command from a remote control device, such as the network device 1. All components are connected to a power-supply unit 22, having a mains connection (not shown).

Further, a signal strength detector 80 is connected to the communication interface 2 for determining the received signal strength of an incoming communication and to provide the CPU 24 with a received signal strength indication (RSSI) value. A proximity memory 120 is connected to the CPU 24 comprising a signal strength threshold value for comparing with said RSSI value, i.e. a proximity threshold, so that it is possible for the CPU 24 to determine, whether a device, communicating to said joining device 111 is in a defined distance. According to the present embodiment, the proximity threshold corresponds to a distance of less than 0,5 meters.

The joining device 111 is configured for operation in a second network system 110 and may communicate with further devices 112 of said second network system 110. The device configuration memory 28 of said joining device 111 comprises a short network address, the Extended PAN-ID, the Network-Key and the Channel No. of said second network system 110.

As discussed above, the network device 1 is configured for operation in the first network system 30. Certainly, although not shown in FIG. 11, the first network system 30 may comprise further devices. The Extended PAN-ID and the Network-Key of said first network system 30 and said second network system 110 are different from each other, i.e. the network device 1 and the joining device 111 are configured for communication in different networks. A network communication, i.e. a communication on the NWK layer addressed with said short network address between network device 1 and joining device 111 is therefore not possible.

According to the present embodiment, the network device 1 and the joining device 111 are configured for operation in a discovery mode. During the discovery mode, the communication interfaces 2 of the network device 1 and the joining device 111 may be driven by the respective CPUs 4 and 24 to communicate in a Zigbee Inter-PAN transmission mode, which allows the network device 1 to exchange information with the joining device 111 although the devices are configured for operation in different Zigbee networks. A Zigbee Inter-PAN transmission may thus be considered as an out-of-network communication channel 31, as shown in FIG. 11.

Zigbee Inter-PAN transmissions are defined in the "Zigbee smart energy profile", as disclosed in document 075356r14, dated May 29, 2008, available from the Zigbee Alliance Inc. Inter-PAN transmission requests are normally handled in the Zigbee stack by a special "Stub" of the application support sub-layer, which performs just enough processing to pass application frames directly to the MAC-layer without involvement of the NWK-layer and to pass received Inter-PAN application frames from the MAC-layer directly to the application.

Figure 13:
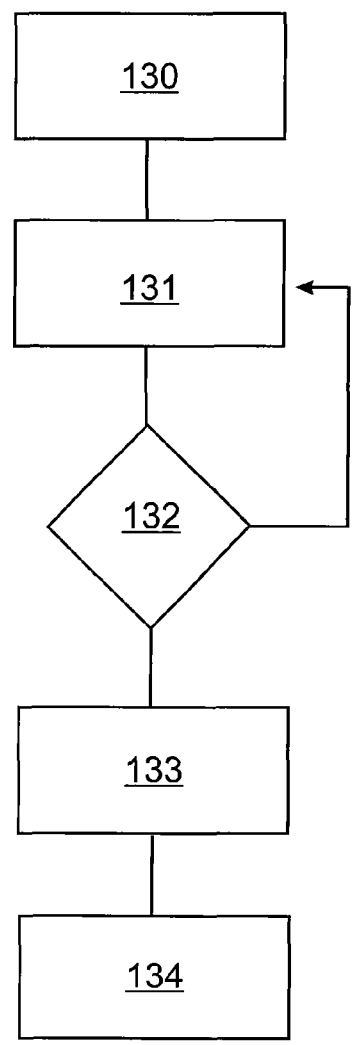
FIG. 13 shows an embodiment of the communication in a discovery mode in a symbolical flowchart and FIG. 14 shows a further embodiment of the communication in the discovery mode in a symbolical flowchart.

A first embodiment of the communication in the discovery mode is in the following explained with reference to FIG. 13, which shows a symbolical flowchart thereof. The discovery mode is initiated for the network device 1 in step 130 upon a user operation, e.g. a button-press of a corresponding "discovery mode" button on the control interface 5. The joining device 111 is configured to be permanently in the discovery mode when configured for network operation, i.e. the device configuration memory 28 is not empty.

Upon activation of the discovery mode, the network device 1 broadcasts a discovery message, i.e. an Inter-PAN transmission, comprising at least the PAN-ID of said first network system 30. The discovery message is sent at regular intervals, according to the present example every two seconds and comprises the PAN-ID of the first network system 30.

The joining device 111 receives said discovery message in step 131 and its signal strength detector 80 determines the received signal strength (RSSI) of said discovery message. The RSSI value is transferred to the CPU 24, which compares the RSSI value with the signal strength threshold value, polled from the proximity memory 120 in step 132. If the RSSI is higher than or equal to the signal strength threshold, i.e. the network device 1 is closer than 0,5 meters to the joining device 111, the joining device 111 enters a commissioning mode according to steps 133-134.

In step 133, the joining device 111 sends a leave request to the devices 112 of said second network system 110 and resets its device configuration memory 28 to remove the communication parameters of said second network system 110.

The device configuration memory 28 of the joining device 111 is then programmed with joining information from the network device 1 in step 134, so that the joining device 111 is addressable in the first network system 30. According to the present embodiment, the joining information comprises a dedicated short network address and the Extended PAN-ID, Network Key and Channel No. of said first network system 30.

The exchange of the joining information in step 134 is implemented according to the following procedure, where all messages are sent in corresponding Zigbee Inter-PAN transmissions:

1. The network device 1 sends a broadcast message, comprising the PAN-ID, stored in the network configuration memory 8.
2. The joining device 111, entered the commissioning mode as explained above, receives said broadcast message and in case the PAN-ID comprised in said broadcast message corresponds to the PAN-ID, received in said discovery message, broadcasts a request to join the network, comprising its MAC-address. It is thus assured, that the exchange of joining information is conducted only with the network device 1.
3. The network device 1 receives said request, assigns the joining device 111 a short network address, stores the short network address in the network configuration memory 8 and sends joining information, comprising the short network address, Extended PAN-ID, Network Key and Channel No. to the joining device 111.
4. The joining device 111 receives and stores the joining information in the device configuration memory 28 and restarts using the joining information for configuration of the communication interface 2 and the CPU 24. The joining device 111 is now a regular member of the first network system 30 and is addressable in the network system 30. As shown in FIG. 5, the network device 1 and the joining device 111 are able to communicate with each other in the network system 30. The commissioning ends.

Once the joining device 111 has joined the network 30, the application interface 25 and thus the lamp 23 is controllable using the user control interface 5 of the network device 1. A button 6 of the network device 1 may be assigned for controlling the specific application interface 25, which is usually referred to as binding. Methods for binding are known in the art, an example is disclosed in the Zigbee specification.

A set-up according to the present example is advantageous, since a dedicated coordinating device is not needed. Commissioning and application control functionality is provided by a single network device 1.

Figure 14:
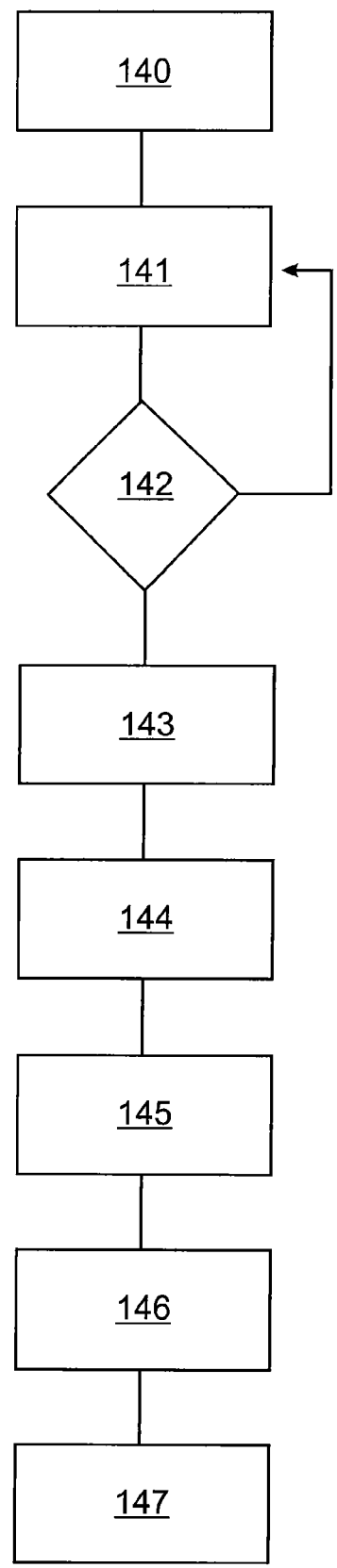

A further embodiment for communication in the discovery mode is shown in a flowchart in FIG. 14. The embodiment of FIG. 14 may be especially advantageous in case more than one device is in physical proximity to the network device 1, so that it may be necessary to choose a specific device to join the network system 30.

As discussed above with reference to FIG. 13, the network device 1 enters the discovery mode in step 140 by a user interaction and broadcasts the Inter-PAN discovery message. According to the present embodiment, the discovery message does not necessarily comprise the PAN-ID.

The joining device 111 receives said discovery message in step 141 and its signal strength detector 80 determines the received signal strength (RSSI) of said discovery message. The RSSI value is transferred to the CPU 24, which compares the RSSI value with the signal strength threshold value, polled from the proximity memory 120 in step 142. If the RSSI is higher than or equal to the signal strength threshold, i.e. the network device 1 is closer than 0,5 meters to the joining device 111, the joining device 111 enters a commissioning mode according to steps 143-147.

In step 143, the joining device 111 broadcasts the RSSI value together with its MAC-address in an Inter-PAN message. The network device 1, receives the broadcast of the joining device 111 in step 144 and all eventual further devices, e.g. with reference to FIG. 11 of the further devices 112 of the second network system 110.

The CPU 4 of the network device 1 then compares the receives RSSI values of all received broadcasts and determines the device, which has sent the highest RSSI value, i.e. the device, which is closest to the network device 1. With reference to FIG. 11 and assuming that although the further devices 112 are in close proximity to the network device 1, the joining device 111 is the closest, the joining device 111 is chosen.

The network device 1 then sends an Inter-PAN reset message to the joining device 111 in step 145, addressed with the MAC-address of the joining device 111. The reset message comprises a specific reset commands and joining information for communication in the network system 30, i.e. as explained above, a short network address and the Extended PAN-ID, Network-Key and Channel No. of the first network system 30.

The joining device 111 receives said reset message in step 146 and resets its device configuration memory 28. The CPU 24 of the device then programs the device configuration memory 28 with the new joining information and restarts in step 147 using the joining information for communication in the first network system 30 and the commissioning ends.

The invention has been illustrated and described in detail in the drawings and the foregoing description. Such illustration and description are to be considered illustrative or exemplary and not restrictive; the invention is not limited to the disclosed embodiments.

For example, it is possible to operate the invention in an embodiment, wherein:
- the network communication corresponds to the IEEE 802.11 protocol,
- the network device 1, 1', 1" is not a remote control device, but a computer or a wall switch,
- the network configuration data is stored in a further memory of the network device 1, 1', 1", separately from the network configuration memory 8, storing the short network addresses of the commissioned and joined devices,
- the network key is stored in a key storage, provided in the network device 1, 1',1" separate from the network configuration memory 8,
- the communication interface 2 is configured to use a standard Zigbee address allocation method, instead of Zigbee Pro,
- the joining information 42 may comprise additional or different information, depending on the communication protocol used,
- the network configuration memory 8 of the network device 1, 1', 1" comprises a predetermined proximity value and the joining device 21 is configured to provide proximity information, relating to the distance between said joining device 21 and said network device 1, 1', 1" and in step 3, the network device 1, 1', 1" determines whether said predetermined proximity information corresponds to said proximity information and only sends the joining information 42 to the joining device 21 in case the proximity information corresponds to the predetermined proximity value,
- the joining device 21, 81, 91, 101, 111 instead of comprising a lamp 23, comprises a further application device or is connected to an application device, such as a humidity sensor, a fire detector, a smoke detector, a water meter, an electricity meter, a gas meter, a heating device or any other type of appliance, the joining device 21, 81, 91, 101, 111 instead of broadcasting the request 41 in step 2 of the commissioning, directs the request 41 to the network device 1 with the Extended PAN-ID, the MAC-address of the joining device 21, 81, 91, 101, 111 is stored in a suitable memory, instead of being comprised in the communication interface 2 and/or with reference to the embodiment of FIG. 14, the network device 1 instead of being configured to automatically chose a device in step 144, is configured to show a list of all devices in proximity on the display 7, for allowing the user to chose a device for commissioning.

Furthermore, the communication in the commissioning mode and/or the discovery mode may alternatively at least partly correspond to Zigbee global PAN-ID transmissions, as defined in document 053474r17, describing "Zigbee 2007" dated Oct. 19, 2007.

Global PAN-ID transmissions, although a transmission on the NWK-layer, are addressed with a special PAN-ID, e.g. DstPANID=0xFFFF, which is routed to and received by every device in range. A global PAN-ID transmission is not encrypted, so that it may be passed to the respective application in a device without further processing or a Network-Key being necessary. A global PAN-ID transmission may therefore with reference to FIGS. 3 and 11 be considered as an out-of-network communication channel 31.

Other variations to the disclosed embodiments can be understood and effected by those skilled in the art practicing the claimed invention from the drawings, the disclosure and the appended claims.

In the foregoing description and in the appended claims, a reference to the singular is also intended to encompass the plural and vice versa and reference to a specific number of features or devices are not to be construed as limiting the invention to the specific numbers of features or devices. Moreover, expressions such as "include" or "comprise" do not exclude other elements and the indefinite article "a" or "an" does not exclude a plurality.

The mere fact that certain measures are recited in mutually different dependent claims does not indicate that a combination of these measures cannot be used to advantage.

A computer program may be stored/distributed on a suitable medium, such as an optical storage medium, a magnetic storage medium or a solid-state medium supplied with or as part of other hardware, but may also be distributed in other forms, such as via the Internet or other wired or wireless telecommunication system.

Any reference signs in the claims should not be construed as limiting the scope of the claims.

The invention claimed is:

1. A wireless network system, comprising:
a network device, comprising a first communication interface for transmitting and receiving data over a wireless medium and a network configuration memory element, and
a joining device comprising a second communication interface for transmitting and receiving data over a wireless medium and a device configuration memory element, said network device and said joining device being configured for communicating in a commissioning mode, wherein:
said network device is configured to broadcast network identification information,
said joining device is configured, upon receipt of said network identification information, to send a request to join the network to said network device, said request comprising a predefined address,
said network device is configured to respond to said request by assigning a network address to said joining device to store data corresponding to said network address in said network configuration memory element and to send joining information comprising at least said network address to said joining device using said predefined address,
said joining device is configured to receive said joining information and to store said joining information in said device configuration memory element, so that said joining device is addressable in the network system using said network address, said network device is associated with a predetermined proximity value, said joining device is configured to provide proximity information, corresponding to the distance between said joining device and said network device and to send said proximity information to said network device, and
said network device is configured to determine whether said predetermined proximity value corresponds to said proximity information and to send joining information to the joining device only if the proximity information corresponds to said predetermined proximity value.

2. The wireless network system according to claim 1, wherein said network device is a first control device comprising a user control interface for sending an application control command to and/or receiving an application data value from another device in the network.

3. The wireless network system according to claim 2, wherein said joining device is a second control device comprising a user control interface for sending an application control command to and/or receiving an application data value from another device in the network.

4. The wireless network system according to claim 1, wherein said joining device is a function device comprising an application interface, connectable to an application device and configured to receive an application control command from and/or to send an application data value to another device in the network.

5. The wireless network system according to claim 1, wherein said communication interface is configured for use in a Zigbee network system.

6. The wireless network system according to claim 1, wherein said communication in said commissioning mode corresponds to Zigbee Inter-PAN Transmissions.

7. The wireless network system according to claim 1, wherein
said network device is associated with predetermined code data and comprises a secondary signal transmitter configured for sending a signal corresponding to said predetermined code data to said joining device,
said joining device comprises a secondary signal receiver, configured to receive said signal and to send corresponding verification information over said wireless medium to said network device, and
said network device is configured to determine whether said verification information corresponds to said code data and to send joining information to the joining device only if the verification information corresponds to said code data.

* * * * *